April 5, 1927.
J. M. MADER
1,623,940
INTERNAL COMBUSTION ENGINE ATTACHMENT
Filed June 7, 1926
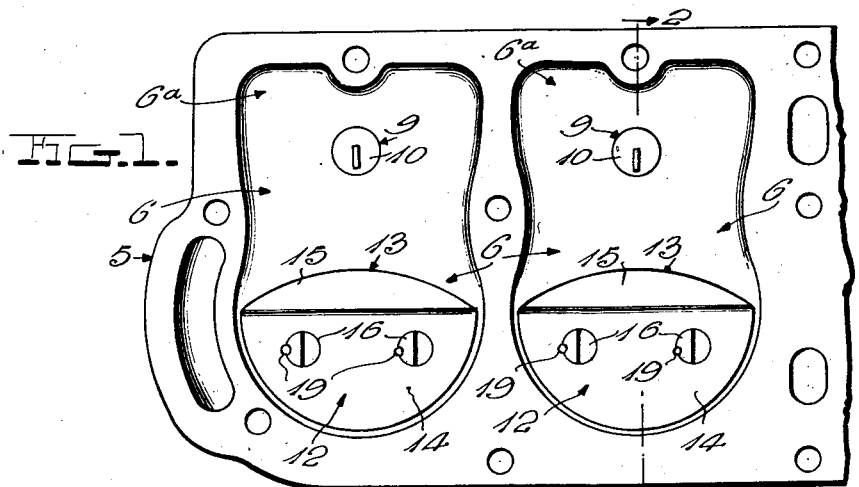
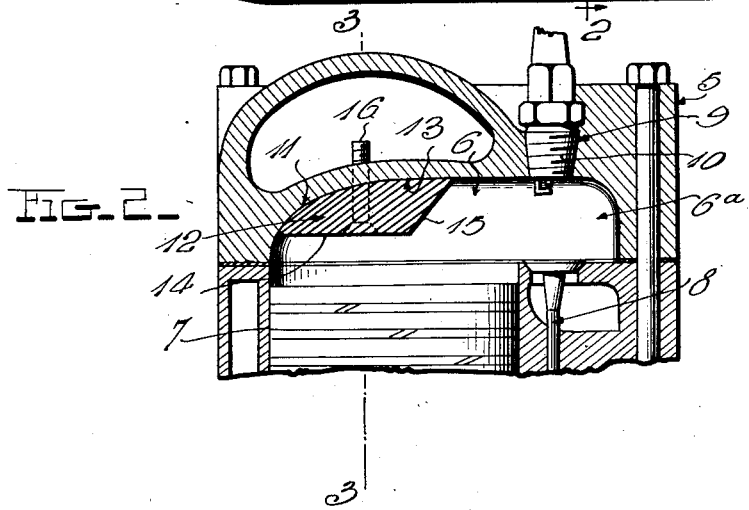
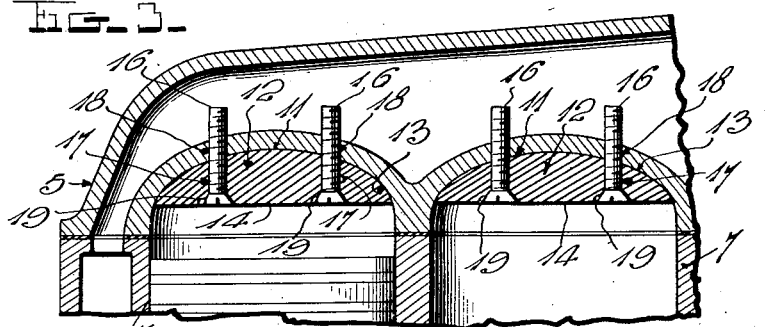
Witnesses
H. Woodard
Inventor
J. M. Mader
By H. B. Wilson & Co.
Attorneys Patented Apr. 5, 1927.

1,623,940

UNITED STATES PATENT OFFICE.

JOSEPH M. MADER, OF BELLEVILLE, ILLINOIS.

INTERNAL-COMBUSTION-ENGINE ATTACHMENT.

Application filed June 7, 1926. Serial No. 114,228.

The invention relates to improvements in internal combustion engines of the type in which the usual detachable cylinder head is provided with a combustion chamber which extends laterally in one direction over the intake and exhaust valves, the laterally extending portion of said chamber having a spark plug opening in its top, while the portion of said top over the engine cylinder, is of concave form. It is the object of the invention to provide an exceptionally simple and inexpensive attachment for insertion within this concave inner end portion of the combustion chamber, for the purposes of decreasing the compression space, facilitating the entrance of gas from the intake valve and the discharge of exhaust gases through the exhaust valve, increasing the power of the engine, giving it greater speed and quicker acceleration, and adding generally to improved and smooth operation of the motor.

With the foregoing in view, the invention resides in the novel subject matter hereinafter described and claimed, the description being supplemented by the accompanying drawing.

Figure 1 is a bottom plan view of a portion of a cylinder head showing the invention applied.

Figure 2 is a transverse section on the plane of line 2—2 of Fig. 1, showing the head attached to the cylinder block.

Figure 3 is a longitudinal section on line 3—3 of Fig. 2, the pistons being shown in elevation in both sectional views.

The numeral 5 designates a cylinder head of conventional form, said head having a combustion chamber 6 for each of the engine cylinders 7. Each combustion chamber has a portion 6ª extending laterally over the valves, one of which is shown at 8, and this laterally extending combustion chamber portion has an opening 9 formed in its top to receive the usual spark plug 10. The inner portion of this combustion chamber top, over the cylinder 7, is formed with a concave lower side 11.

All structural features so far described, are common to a number of internal combustion engines now in use and are illustrated and explained in order that the manner of carrying my improvement into effect may be made clear.

The numeral 12 designates a metal block having a convex upper side 13 shaped to accurately fit the concave portion 11 of the combustion chamber top, said block being formed with a flat lower side 14 and having a straight inner edge 15 at an obtuse angle to said lower side 14. This inclined inner edge 15 extends transversely of the combustion chamber 6 and inclines toward, but terminates in spaced relation with the spark plug opening 9, as clearly shown in Figs. 1 and 2.

The block 12 may be welded, brazed, or otherwise secured in the chamber 6. For purposes of illustration, attaching screws 16 have been shown passing through openings 17 in the block 12 and threaded into additional openings 18 in the top of the combustion chamber. The heads of these screws are preferably countersunk and they may be locked against release by any desired means, for instance, by punching portions of their heads into adjacent portions of the block 12, as indicated at 19.

In actual use, the invention has generally increased the efficiency of a Ford motor. It cuts down the compression space and thus insures higher compression with greater power and quicker pick-up, as well as permitting increased speed. Moreover, when the cylinder fires, the greater force of the explosion is exerted downwardly on only a portion of the piston, the pressure acting against the piston immediately under the block 12, being at that time somewhat less than the pressure acting against the piston portion which projects beyond the lower side 14 of the block. This gives the piston less of a downward jerk than in the ordinary motor construction and hence bearing knocks are decreased to the minimum. Moreover, the inclined inner edge 15 of the block serves as an effective baffle for guiding the explosive gases from the intake valve down into the cylinder and for similarly guiding exhaust gases from the cylinder toward the exhaust valve.

The device is simple and inexpensive, may be easily manufactured and installed, and is in every way desirable. On account of such advantages as these, and those above enumerated, the details disclosed are preferably followed. However, within the scope of the invention as claimed, variations may be made.

I claim:

1. In an internal combustion engine whose cylinder head is formed with a combustion chamber extending laterally in one direction over intake and exhaust valves, said laterally extending portion having a spark plug opening in its top, and the portion of said top over the engine cylinder being of concave form; a metal block having a convex upper side secured against said concave top portion of the combustion chamber, said block having a substantially flat lower side and having a flat inner edge which inclines at an obtuse angle from its lower side toward but terminates in spaced relation with said spark plug opening.

2. A cylinder head attachment comprising a one-piece metal block having a convex upper side to accurately contact with the concave top at the inner end portion of a cylinder head combustion chamber, said block having a substantially flat lower side and an inner edge at an obtuse angle to said lower side.

3. In an internal combustion engine whose cylinder head is formed with a combustion chamber extending laterally in one direction over intake and exhaust valves, said laterally extending portion having a spark plug opening in its top, and the portion of said top over the engine cylinder being of concave form; a removable metal block having a convex upper side secured against said concave top portion of the combustion chamber, said block having a substantially flat lower side and having a flat inner edge which inclines at an obtuse angle from its lower side toward but terminates in spaced relation with said spark plug opening, and fastening means engaged with said block and concaved top portion of the cylinder head for removably securing the former to the latter.

In testimony whereof I have hereunto affixed my signature.

JOSEPH M. MADER.